(No Model.) 7 Sheets—Sheet 1.

A. EPPLER, Jr.
NAILING MACHINE.

No. 354,052. Patented Dec. 7, 1886.

WITNESSES:
C. S. Gooding
W. O. Horner

INVENTOR
Andrew Eppler Jr
by Wright Brown & Crosley
Attys.

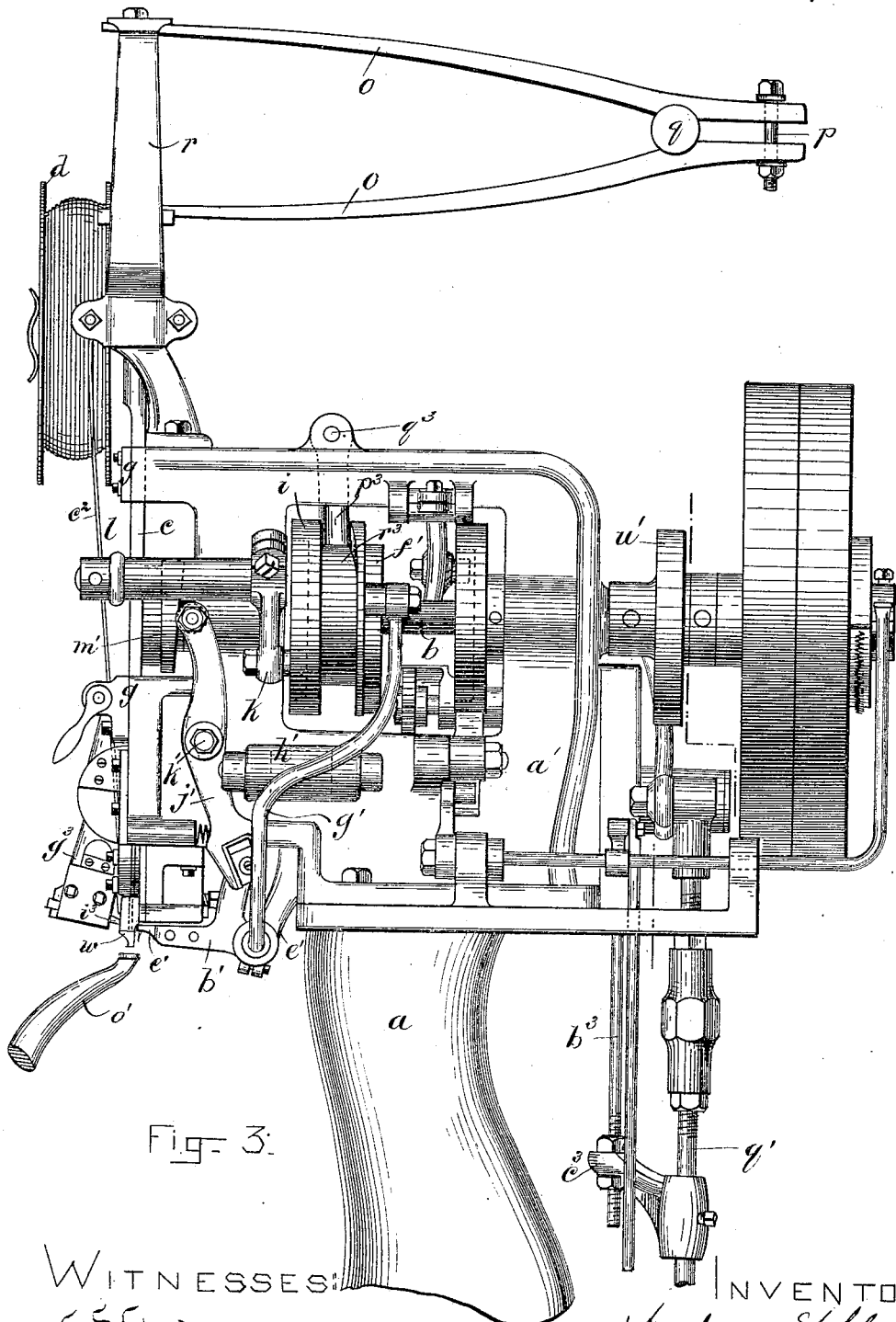

(No Model.) 7 Sheets—Sheet 4.
A. EPPLER, Jr.
NAILING MACHINE.
No. 354,052. Patented Dec. 7, 1886.
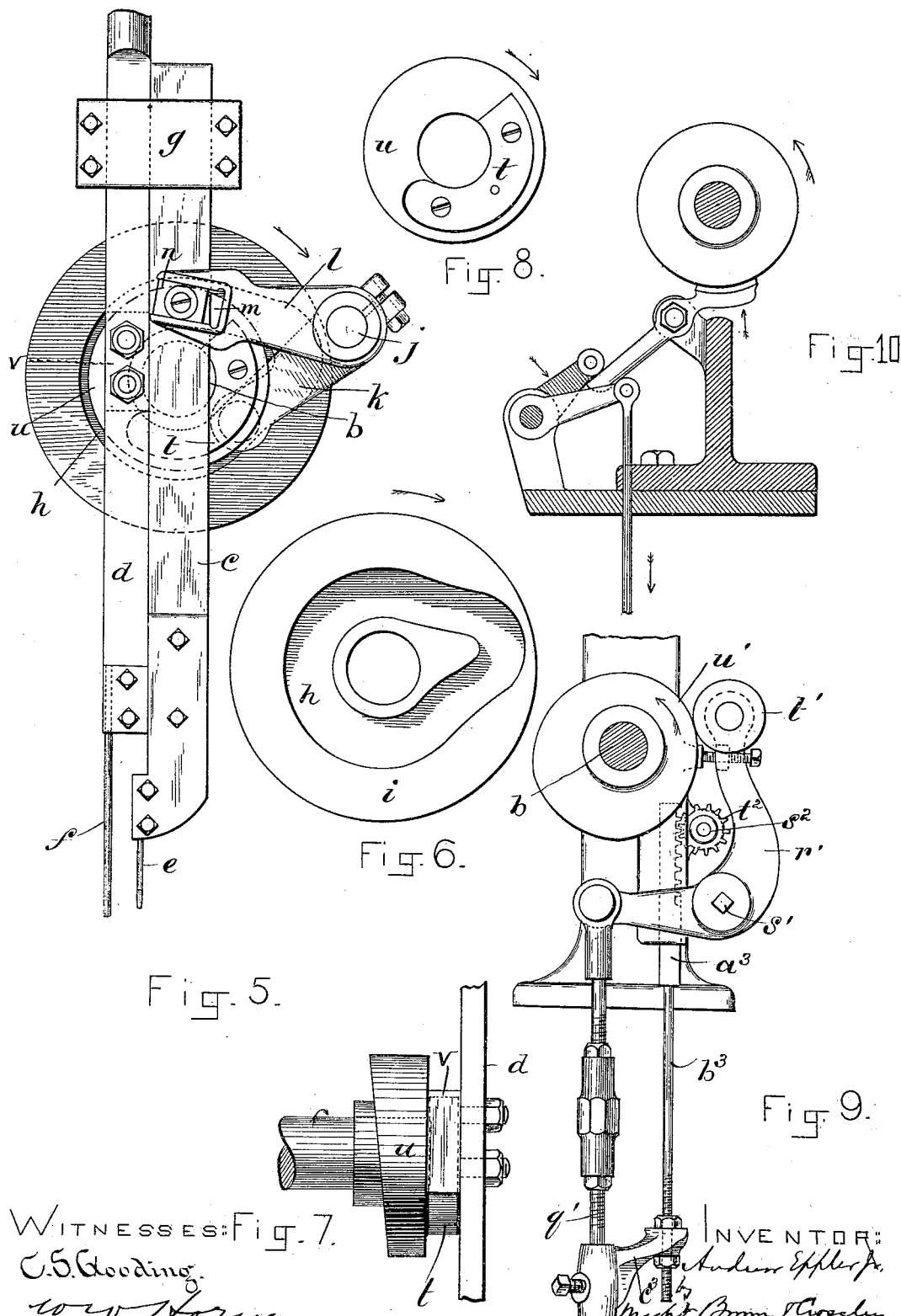

(No Model.) 7 Sheets—Sheet 5.

A. EPPLER, Jr.
NAILING MACHINE.

No. 354,052. Patented Dec. 7, 1886.

WITNESSES:
C.S. Gooding
W.W. Horner

INVENTOR:
A. Eppler Jr.
by Wight, Brown & Crosby
Attys.

(No Model.) 7 Sheets—Sheet 6
A. EPPLER, Jr.
NAILING MACHINE.
No. 354,052. Patented Dec. 7, 1886.
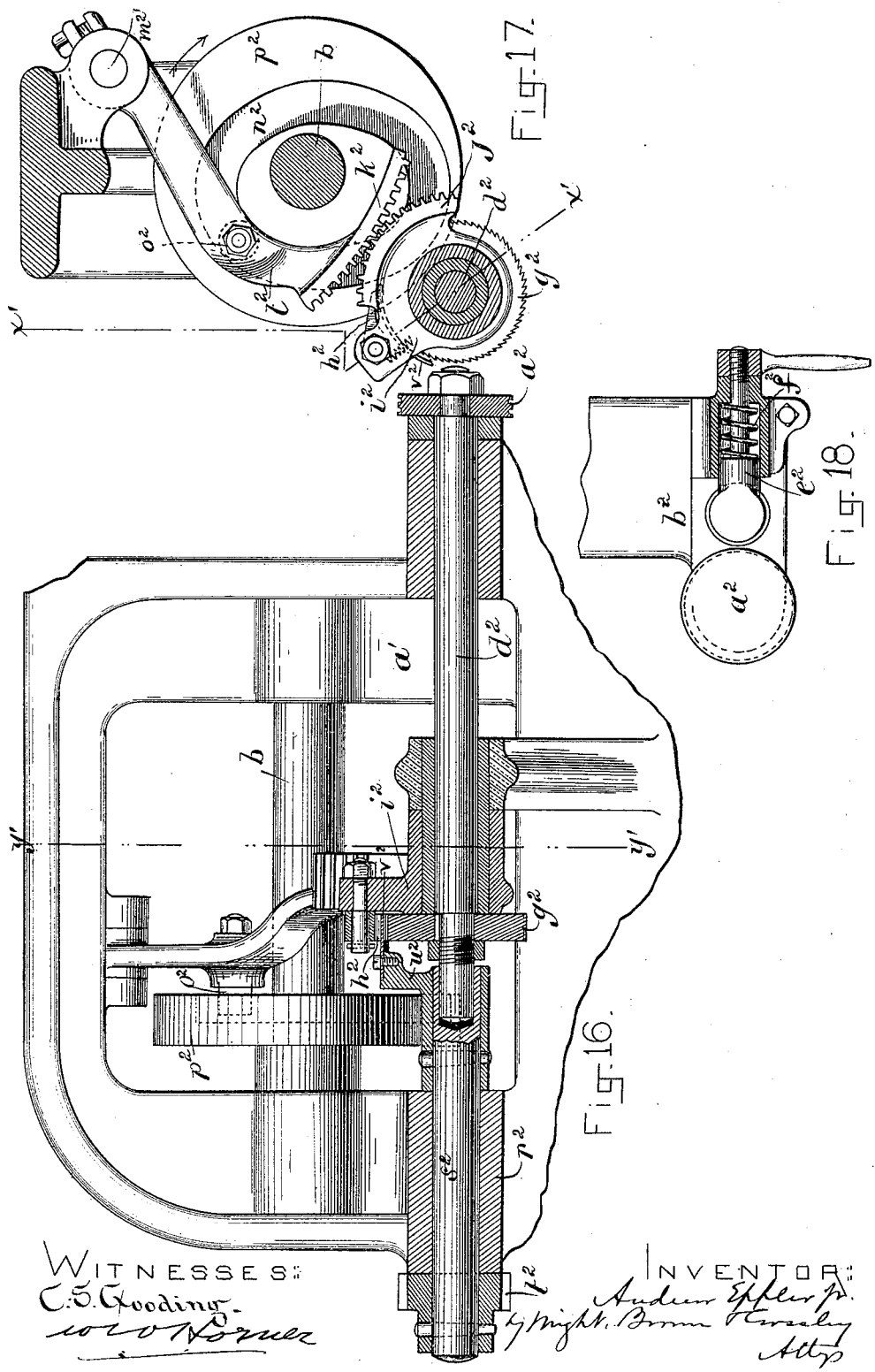
WITNESSES:
C. S. Gooding
Lolo Horner
INVENTOR:
Andrew Eppler Jr.
by Wright, Brown & Crosby
Attys (No Model.) 7 Sheets—Sheet 7.
A. EPPLER, Jr.
NAILING MACHINE.
No. 354,052. Patented Dec. 7, 1886.
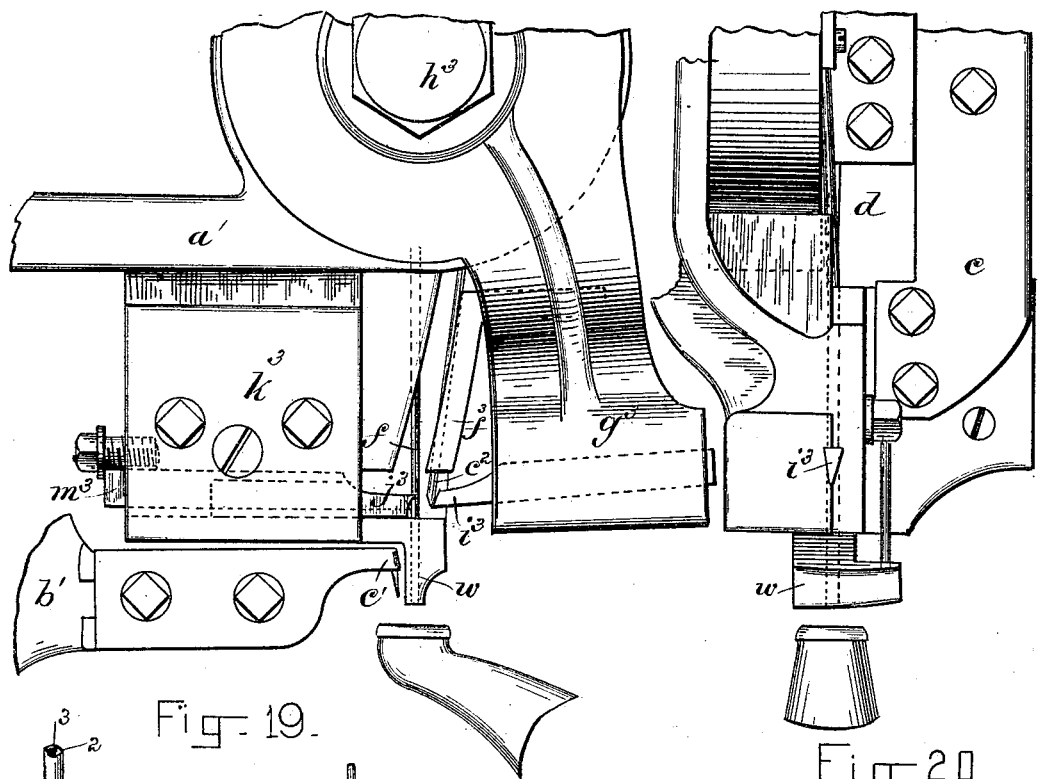
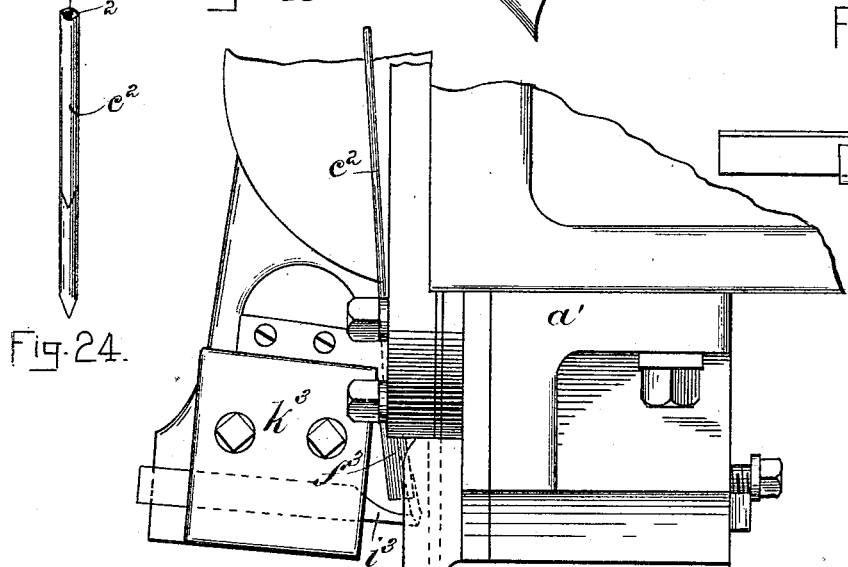
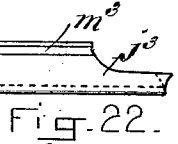
Witnesses:
C.S. Gooding
W.W. Horner
Inventor:
A. Eppler Jr.
by Wright Brown & Crosby
Attys

UNITED STATES PATENT OFFICE.

ANDREW EPPLER, JR., OF BOSTON, MASS., ASSIGNOR TO THE UNION METALLIC FASTENING COMPANY, OF JERSEY CITY, N. J.

NAILING-MACHINE.

SPECIFICATION forming part of Letters Patent No. 354,052, dated December 7, 1886.

Application filed January 11, 1886. Renewed October 20, 1886. Serial No. 216,738. (No model.)

*To all whom it may concern:*

Be it known that I, ANDREW EPPLER, Jr., of Boston, in the county of Suffolk and State of Massachusetts, have invented certain new and useful Improvements in Nailing-Machines, of which the following is a specification.

This invention relates to that class of boot and shoe nailing machines in which the nails are cut from a continuous wire and driven by the same machine, and in which the work is supported by a vertically-movable horn during the driving operation, and the length of the nails is automatically regulated by the vertical position of the horn.

The invention has for its object to provide certain improvements, first, in the means for feeding the work after each nail is driven; secondly, in the means for automatically varying the length of the nails by variations in the thickness of the sole; and, thirdly, in the means for locating the nails in the throat, through which they are driven into the sole.

To these ends my invention consists in the improvements which I will now proceed to describe and claim.

Figures 1, 2:
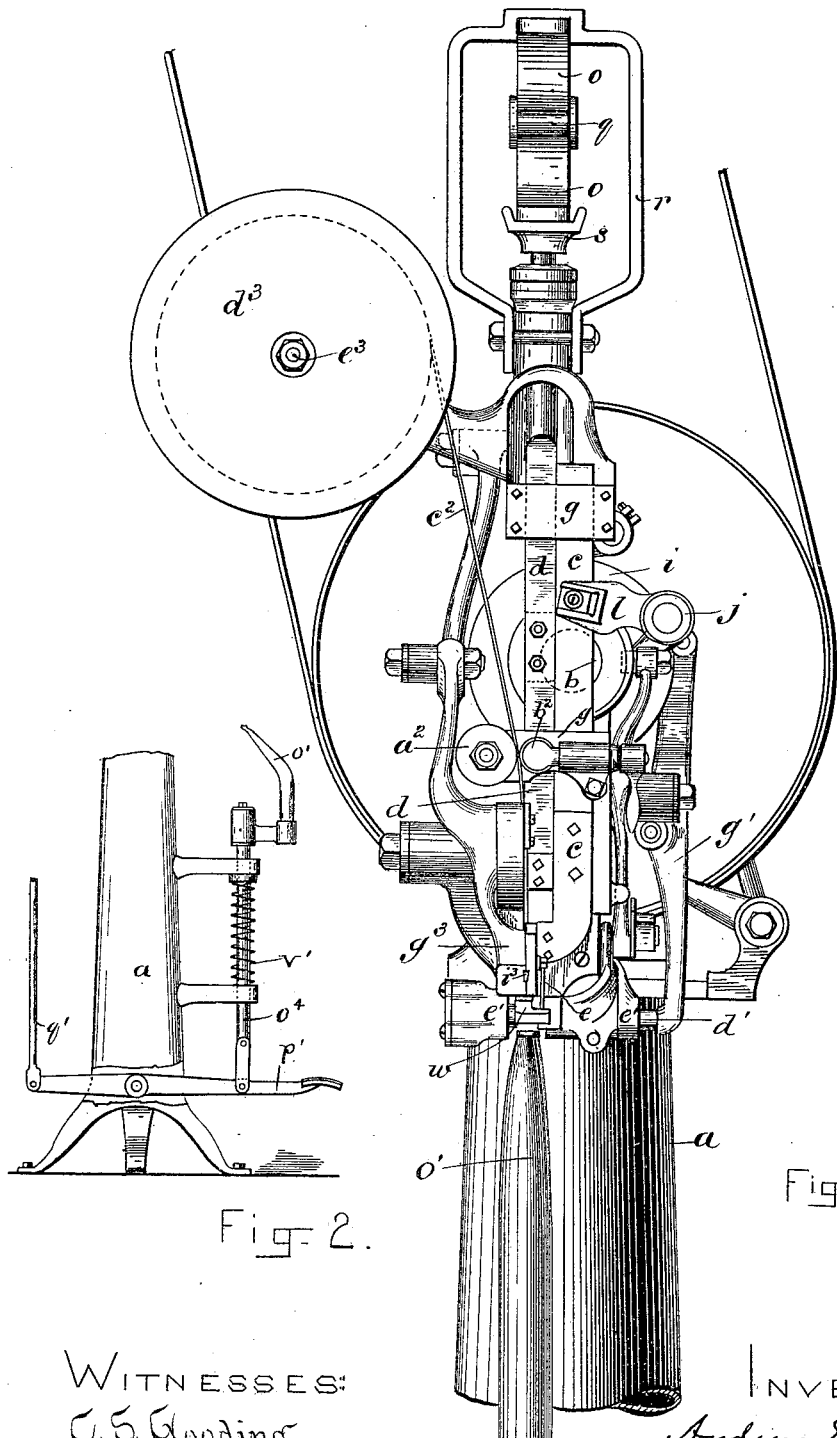
Figure 4:
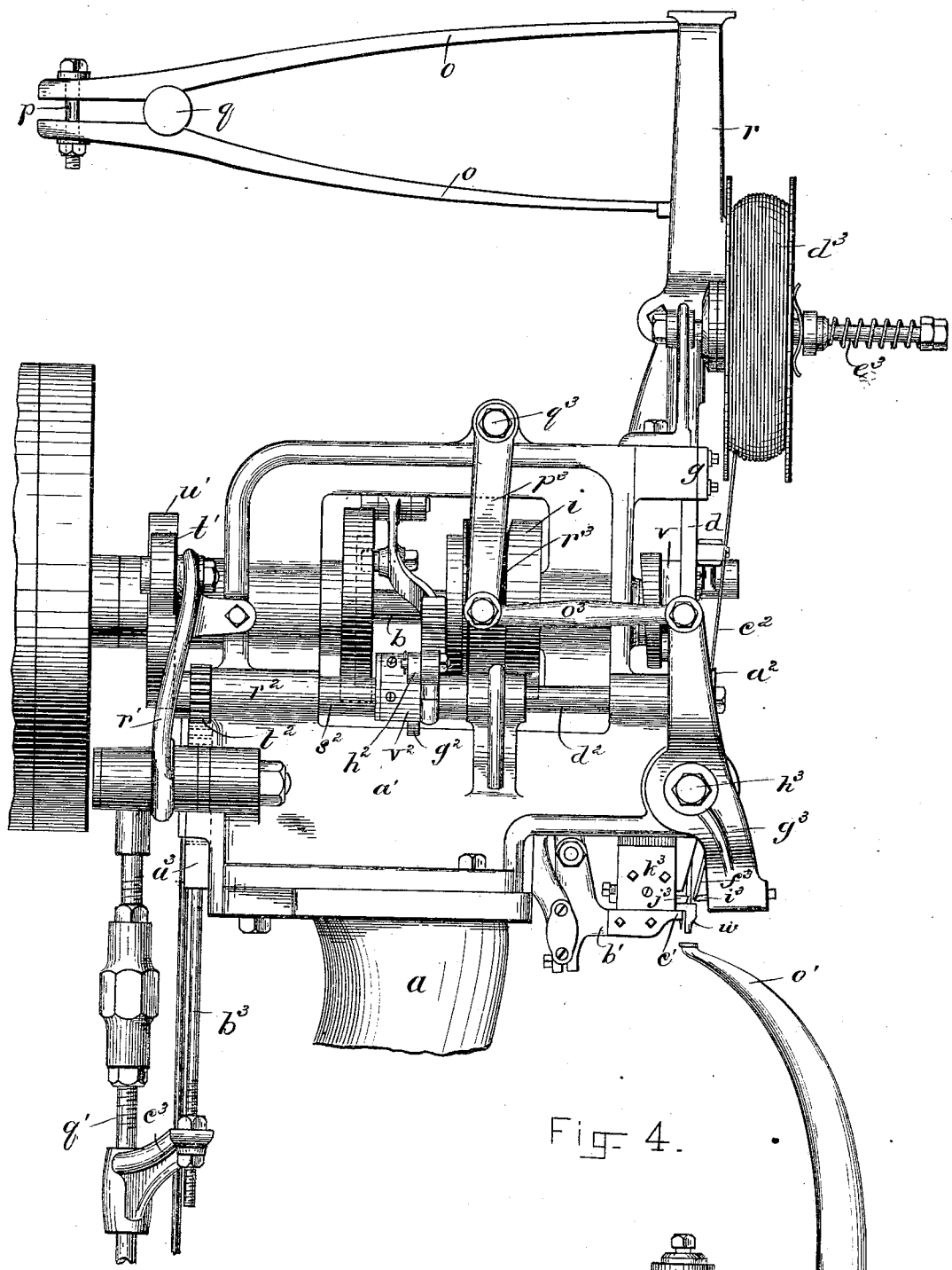
Figure 11:
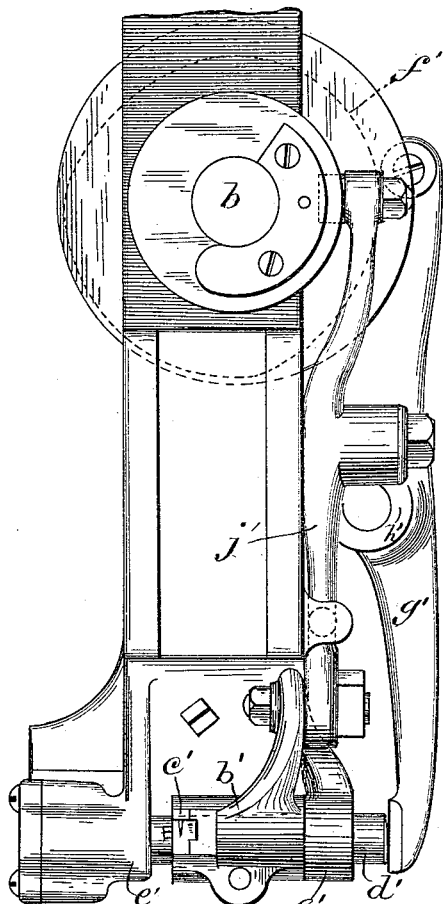
Figure 12:
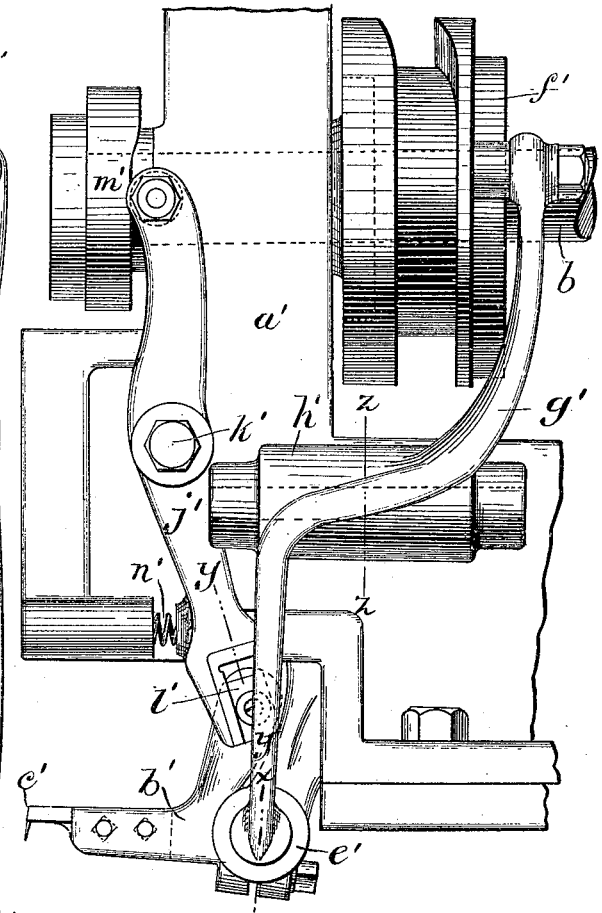
Figure 13:
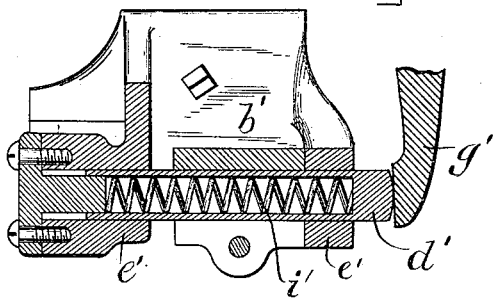
Figure 14:
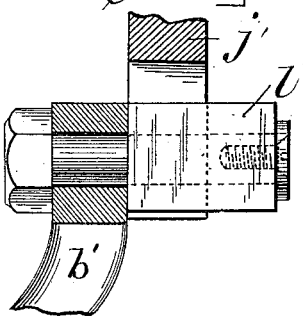
Figure 15:
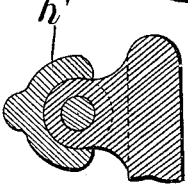

Of the accompanying drawings, forming a part of this specification, Figure 1 represents a front elevation of the principal portion of my improved machine. Fig. 2 represents a reduced side elevation of the lower portion of the machine, not shown in Fig. 1. Figs. 3 and 4 represent enlarged side elevations of the mechanism shown in Fig. 1. Figs. 5, 6, 7, 8, 9, and 10 represent detail views. Figs. 11 and 12 represent front and side elevations of the work-feeding mechanism. Fig. 13 represents a section on line $x\ x$, Fig. 12. Fig. 14 represents a section on line $y\ y$, Fig. 12. Fig. 15 represents a section on line $z\ z$, Fig. 12. Fig. 16 represents a section through the wire-feeding roll and a portion of its operating mechanism on line $x'\ x'$, Fig. 17, and a side elevation of a portion of the supporting-frame and a portion of the positive feed-roller operating mechanism, said figure showing also in section a portion of the mechanism for varying the extent of movement of the positive feed-roll. Fig. 17 represents a section on line $y'\ y'$, Fig. 16. Fig. 18 represents a front view of the feed-rolls. Figs. 19, 20, and 21 represent elevations of the throat and the wire deflecting and cutting devices. Figs. 22 and 23 represent views of the fixed cutter. Fig. 24 represents a side view of a portion of the wire and a nail cut therefrom.

The same letters of reference indicate the same parts in all the figures.

In the drawings, $a$ represents the supporting-post or pedestal, to which is affixed the head or frame $a'$, supporting the driving-shaft $b$. Said shaft has a series of cams, which actuate the operative parts of the machine, as hereinafter described.

$c$ represents the awl-bar, and $d$ the driver-bar, provided, respectively, with the awl $e$ and driver $f$. Said bars are fitted to reciprocate vertically in fixed guides $g\ g$ in the frame $a'$, the awl having no lateral movement for the purpose of feeding the work, as in some other machines of this class.

The awl-bar is reciprocated by a cam-groove, $h$, Figs. 5 and 6, in a disk, $i$, on the driving-shaft, a rock-shaft, $j$, journaled in a bearing affixed to the head or frame, and two arms, $k\ l$, affixed to said rock-shaft, the arm $k$ being engaged by a roller with the cam-groove $h$ and the arm $l$ with the awl-bar by means of a slot, $m$, receiving a block, $n$, pivoted to said bar. The driver-bar is depressed to drive the nails by a spring of any suitable construction, the spring here shown being composed of two flexible wooden bars, $o\ o$, connected at their rear ends by a headed bolt, $p$, and an adjustable nut thereon, and slightly separated near said bolt by a transverse pin, $q$. The forward ends of said bars bear, respectively, against a stirrup, $r$, affixed to an arm on the frame $a'$, and against a cap, $s$, Fig. 1, attached to the upper end of the driver-bar.

The driver-bar is raised against the pressure of the spring by a semicircular cam, $t$, Figs. 5, 7, and 8, affixed to the side of the disk $u$ on the driving-shaft, said cam being formed to alternately bear against and raise a block, $v$, affixed to the driver-bar, and release said block, thus alternately raising and releasing the driver-bar, which is forcibly depressed by its spring when released.

$w$ represents the throat, against which the sole is pressed during the nailing operation, and through which the nails are forced by the driver into the sole.

The work is fed by an independent four-motioned feeding-dog, $c'$, which is attached to one arm of a two-armed lever, $b'$. Said lever is affixed to a rock-shaft, $d'$, which is adapted both to oscillate and to move longitudinally in bearings $e'\ e'$, affixed to the frame $a'$, the feed-dog being moved laterally by the longitudinal movements of the lever and vertically by the oscillating movements, said movements alternating, so that the dog is first depressed and caused to engage the sole by the downward oscillating movement of the lever $b'$, then caused to feed the work by a lateral movement of said lever, then raised by the upward oscillating movement of the lever, and then moved laterally back to its original position while raised out of contact with the sole.

The described lateral movement of the lever $b'$ and the feed-dog are effected by means of a cam, $f'$, on the driving-shaft, a lever, $g'$, affixed to a socket, $h'$, which is mounted on a stud or bearing affixed to the frame $a'$, said lever bearing at one end against the cam $f'$ and at the other end against the rock-shaft $a'$; and a spring, $i'$, Fig. 13, inserted in a cavity formed in the rock-shaft, and serving to press the rock-shaft against the lever $g'$, and thus keep the upper end of said lever in contact with the cam $f'$. The oscillating movements of the lever $b'$ are effected by a lever, $j'$, pivoted at $k'$ to the frame $a'$, and slotted at its lower end to receive a block, $l'$, pivoted to the lever $b'$, a cam, $m'$, against which the upper end of the lever $j'$ bears, and a spring, $n'$, Fig. 12, which is held in a socket in the frame $a'$, and bears against the lever $j'$, so as to press its upper end against the cam $m'$.

$o'$ represents the work-supporting horn attached to a vertically-movable standard, $o^4$, which is supported by a lever, $p'$, pivoted to the base of the standard $a$, the standard $o^4$ being connected to one end of said lever, so that it is capable of being moved vertically by the oscillations of said lever, as usual in machines of this class. The opposite end of the lever $p'$ is connected by a vertical rod, $q'$, with one end of a bell-crank lever, $r'$, pivoted at $s'$ to the frame $a'$. The other arm of said lever has a roller, $t'$, which bears on a cam, $u'$, on the driving-shaft. The cam is formed to give the lever the oscillating movements required to cause it to depress the horn at intervals by raising the rod $q'$, and thus cause the horn to release the work held between it and the throat during the feeding of the work, the horn being normally raised or pressed upwardly by a spring, $v'$, interposed between a collar attached to the standard $o^4$ and one of the guides in which said standard slides. (See Fig. 2.)

$a^2$ represents a positively-rotated feed-roll, which co-operates with a spring-pressed roll, $b^2$, in feeding the wire $c^2$, from which the nails are made intermittingly, to the severing and point-forming cutters, hereinafter described.

The positively-rotated roll is mounted on an arbor, $d^2$, journaled in bearings on the frame $a'$, said arbor being rotated intermittingly by means hereinafter described. The spring-pressed roll is journaled in a sliding holder, $e^2$, (shown in section in Fig. 18,) said holder and its roll being pressed toward the roll $a^2$ by a spring, $f^2$, in a fixed socket, in which the holder is adapted to slide.

To the arbor $d^2$, carrying the feed-roll $a^2$, is rigidly attached a ratchet, $g^2$, Figs. 4, 16, and 17, with which engages a pawl, $h^2$, pivoted to an ear on a sleeve or collar, $i^2$, which is fitted to turn loosely on one of the bearings in which the arbor $d^2$ is journaled. On the sleeve $i^2$ is formed a rack-segment, $j^2$, Fig. 17, meshing with a rack-segment, $k^2$, on a lever, $l^2$, which is pivoted at $m^2$ to an ear on the frame $a'$, and has a stud or roll, $o^2$, entering a cam-groove, $n^2$, in a disk, $p^2$, on the driving-shaft. The rotation of the disk $p^2$ causes the groove $n^2$ to oscillate the lever $l^2$ and rack-segment $k^2$, and thus oscillate the sleeve $i^2$ and cause its pawl $h^2$ to alternately engage with and slip on the ratchet, so that the arbor $d^2$ and feed-roll $a^2$ are thus rotated intermittingly, the arbor remaining at rest when the pawl is slipping back on the teeth of the ratchet.

In machines of this class it is usual to provide means whereby the length of the feeding movement of the wire, and therefore the length of the nails, is governed by the distance between the end of the horn and the throat through which the nails are driven, so that the length of the nails is caused to conform automatically to the thickness of the part of the sole that is interposed between the horn and throat.

I have provided improved automatic means whereby the length of the nails formed is caused to exceed the distance between the end of the horn and the throat, and whereby any increase in said distance causes a greater increase in the length of the nail, so that the length of the nail in all cases has a given relation to the thickness of the sole. In other words, when the horn is separated from the throat a quarter of an inch by the interposed work the nail formed will have a greater length—say three-eighths of an inch—and when the separation of the horn from the throat is increased to half an inch by an increase in the thickness of the interposed work, the length of the nail, instead of being increased to exactly correspond to the increase in the thickness of the work, so as to still exceed the thickness of the work by one-eighth of an inch, will be proportionately increased to six-eighths of an inch, the excess in the length of the nail over the thickness of the work being doubled. The object of this proportional variation in the surplus length of the nail is to compensate for the longitudinal compression or shortening of the nails by the driver during the driving operation, the nails being cut from wire made by forming a thin strip of sheet metal into a tube, 2, around a fibrous cord or core, 3. (See Fig. 24.) This construction of the wire makes the nails suitable to be longitudinally compressed or shortened by the driver, and the extent of such compression or shortening is in proportion to the length of the nail, a nail a half an inch long being shortened twice as much as one a quarter of an inch long.

The means which I employ to produce the described proportional variation in the surplus length of the nails are as follows: Journaled in a bearing, $r^2$, on the frame $a'$ is a rock-shaft, $s^2$, to one end of which is affixed a pinion, $t^2$, and to the other end an arm, $u^2$, having a segmental plate or shield, $v^2$, concentric with the rock shaft $s^2$, said shield projecting over a portion of the perimeter of the ratchet $g^2$, as shown in Figs. 16 and 17, and being formed to be interposed between the ratchet and its pawl $h^2$ to any desired extent, so as to prevent the pawl from engaging with the ratchet during a portion of its forward movement, and thus limit the extent of movement imparted to the ratchet and feed-roll by the forward movement of the pawl.

$a^3$ represents a rack which is fitted to slide in a vertical guide in the frame $a'$, and meshes with the pinion $t^2$ on the rock-shaft $s^2$. Said rack is connected by a downwardly-extending rod, $b^3$, with an arm, $c^3$, on the rod $q'$, which connects the horn supporting lever $p'$ with the bell-crank lever $r'$, bearing on the cam $u'$, so that any vertical movement of said rod is imparted to the rack, and the latter is caused thereby to partially rotate the pinion $t^2$ and the shaft $s^2$ and segmental shield $v^2$ in one direction or the other, according to the direction of movement of the rod $q'$.

The arrangement of the shield $v^2$ is such that when the horn is raised to its highest point the shield projects under the pawl $g^2$ to such an extent as to permit the pawl to engage with the ratchet during a limited portion of its forward movement, the pawl bearing on the outer surface of the shield, as shown in Fig. 17, during the last part of its forward movement, and passing off from the shield and engaging with the ratchet during the latter part. The feed-roll $a^2$, therefore, has the shortest movement when the horn is in its highest position. When the horn is depressed, the shield is moved back, so that it intercepts the pawl less, and permits it to give the ratchet and feed-roll a longer movement, the length of movement depending on the extent of the depression of the horn.

The described devices are proportioned and arranged to give the nails the above-described proportional surplus, the increase in the length of the feed movement, caused by a depression of the horn a given distance, being more than twice the increase caused by a depression of the horn half of said distance.

The wire $c^2$ is drawn from a coil supported by a reel, $d^3$, journaled on a stud, $e^3$, affixed to the frame $a'$, and passes from the reel between the feed-rolls and bears against a grooved finger, $f^3$, affixed to lever $g^3$, which is pivoted at $h^3$ to the frame $a'$, and has secured to its lower end, at a point below the finger $f^3$, a V-shaped cutter, $i^3$.

$j^3$ represents a cutter adjustably secured to a holder, $k^3$, affixed to the frame $a'$, and provided with a V-shaped groove formed to receive the V-shaped cutter $i^3$. The intersection of the end of the cutter $j^3$ and the sides of the V-shaped groove therein form cutting-edges, which co-operate with the cutting-edges formed by the intersection of the sides and end of the cutter $i^3$ in severing the wire with a V-shaped cut, thus forming at one operation a V shaped notch in the outer end of the nail detached by the operation of the cutters and a V-shaped end on the wire, which end forms the point of the next nail. (See Fig. 24.) Within the groove in the cutter $j^3$ is an adjustable piece, $m^3$, having a beveled end, which co-operates with the end of the cutter $i^3$ in compressing the points formed on the wire by the cutters.

The lever $g^3$ is connected by a rod, $o^3$, to a lever, $p^3$, which is pivoted at $q^3$ to the frame $a'$, and has a roller projecting into a cam-groove, $r^3$, in the disk $i$ on the driving-shaft. The lever $p^3$ is oscillated by the rotation of the disk $i$, and oscillates the lever $g^3$. When the cutter-carrying end of the lever $g^3$ advances toward the cutter $j^3$, the finger $f^3$, bearing against the wire, moves its lower end laterally into position to enter the orifice in the throat before the wire is fed, the feeding movement and the severing of the wire taking place immediately after the lateral movement thereof. The nail is thus placed in position to be driven before it is severed from the wire, and the use of a carrier to move the nail into position to be driven after it is severed from the wire is avoided.

The described mechanism is timed to operate as follows: The work being held between the horn and throat, the awl descends and perforates the sole, and then rises. While the awl is rising, the feed-dog descends and engages the sole. The horn is then depressed, releasing the work, and the feed-dog is moved laterally the required distance to feed the work. The horn then rises and clamps the work against the throat $w$, and after the work is clamped the feed-dog rises. During the feeding movement of the work the wire is moved laterally into line with the orifice in the throat, and after the work is clamped the wire is fed into the throat and then cut, a nail being thus left in the throat. The cutter $i^3$ and bending-fingers $f^3$ then move back, and the driver descends and forces the nail into the sole. After the nail is driven, and while the work is clamped between the horn and throat, the awl descends and forms the next hole, and thus the operation is continued.

I claim—

1. In a boot and shoe nailing machine, the combination of the awl and a driver movable in fixed guides, mechanism, substantially as described, to operate said awl and driver, an independent four-motioned feed-dog, and mechanism, substantially as described, for operating the same, as set forth.

2. In a boot and shoe nailing machine, the combination of an awl and a driver movable in fixed guides, mechanism to operate said awl and driver, a pointed feed-dog located at one side of the awl and driver, an oscillating and longitudinally-movable rock-shaft having an arm supporting said feed-dog, and mechanism, substantially as described, for oscillating and reciprocating said rock-shaft, as set forth.

3. In a boot and shoe nailing machine, the combination of the wire-feeding roll $a^2$, its arbor having a ratchet, $g^2$, a reciprocating pawl whereby said ratchet and roll are rotated intermittingly, a shield, $v^2$, the rock-shaft $f^2$, having the pinion $t^2$, the arm $u^2$, and the plate or shield $v^2$, formed to partially cover said ratchet and limit the action of the pawl thereon, the reciprocating rack $a^3$, meshing with the pinion $t^2$, the vertically-movable horn, and intermediate mechanism, substantially as described, whereby said rack is moved vertically by the vertical movements of the horn and the position of the shield is regulated, as set forth.

4. In a boot and shoe nailing machine, the combination of the wire feeding rolls, mechanism for operating them, the fixed cutter $j^3$, the throat $w$, the lever $g^3$, having the cutter $i^3$ and the wire-deflecting finger $f^3$, and mechanism for oscillating said lever, as set forth.

In testimony whereof I have signed my name to this specification, in the presence of two subscribing witnesses, this 8th day of January, 1886.

ANDREW EPPLER, JR.

Witnesses:
J. D. TOLMAN,
C. F. BROWN.